(12) United States Patent
Satkunanathan et al.

(10) Patent No.: US 8,239,943 B2
(45) Date of Patent: *Aug. 7, 2012

(54) NETWORK SECURITY PAGE

(75) Inventors: Lingan Satkunanathan, Kirkland, WA (US); Krishna Sunkammurali, Seattle, WA (US); Eric B. Watson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1077 days.

This patent is subject to a terminal disclaimer.

(21) Appl. No.: 11/506,609

(22) Filed: Aug. 18, 2006

(65) Prior Publication Data

US 2008/0047007 A1 Feb. 21, 2008

(51) Int. Cl.
*H04L 29/06* (2006.01)
(52) U.S. Cl. ........... 726/23; 715/853; 715/854; 709/224
(58) Field of Classification Search .................. None
See application file for complete search history.

(56) References Cited

U.S. PATENT DOCUMENTS

| | | | |
|---|---|---|---|
| 6,408,391 B1 * | 6/2002 | Huff et al. | 726/22 |
| 6,456,306 B1 * | 9/2002 | Chin et al. | 715/810 |
| 6,765,591 B2 * | 7/2004 | Poisson et al. | 715/735 |
| 7,127,743 B1 * | 10/2006 | Khanolkar et al. | 726/23 |
| 7,617,073 B2 * | 11/2009 | Trinon et al. | 702/183 |
| 7,664,849 B1 * | 2/2010 | Chandler et al. | 709/224 |
| 7,827,252 B2 * | 11/2010 | Hopmann et al. | 709/217 |
| 7,899,901 B1 * | 3/2011 | Njemanze et al. | 709/224 |
| 2002/0054169 A1 * | 5/2002 | Richardson | 345/854 |
| 2002/0083343 A1 * | 6/2002 | Crosbie et al. | 713/201 |
| 2003/0154399 A1 * | 8/2003 | Zuk et al. | 713/201 |
| 2003/0158905 A1 * | 8/2003 | Petry et al. | 709/206 |
| 2005/0021733 A1 * | 1/2005 | Clinton et al. | 709/224 |
| 2005/0044418 A1 * | 2/2005 | Miliefsky | 713/201 |
| 2006/0085790 A1 * | 4/2006 | Hintermeister et al. | 718/100 |
| 2006/0150250 A1 * | 7/2006 | Lee et al. | 726/23 |
| 2006/0294231 A1 * | 12/2006 | Blencowe | 709/224 |
| 2007/0233854 A1 * | 10/2007 | Bukovec et al. | 709/224 |

OTHER PUBLICATIONS

Sullivan, Chad Cisco Security Agent Jun. 1, 2005 Cisco Press Chapter 8, pp. 1-8.*

* cited by examiner

*Primary Examiner* — David Pearson
(74) *Attorney, Agent, or Firm* — L. Alan Collins; Collins & Collins Intellectual, LLC

(57) ABSTRACT

Described is a technology by which a user interface page outputs security status information obtained from network-wide and/or network client security components. This allows for simultaneous evaluation of the state of various network-wide and client security components, such as antimalware state, anti-spam state, firewall state, client program update state, and state data from a remote security service. Network security page logic couples to network-wide security components and client security components to obtain security state data for each. A user interface associated with the network security page logic lists the security components and the current security status for each, such as via an icon that changes its appearance to reflect the current state. Interactive mechanisms for launching system-wide security tasks and/or context-sensitive security tasks related to a selected security component may be provided on the user interface page, as may an interactive mechanism for resolving a security-related issue.

17 Claims, 10 Drawing Sheets

NETWORK SECURITY PAGE

BACKGROUND

Information technology (IT) is an important part of commercial businesses and other enterprises, such as educational institutions and the like. IT administration was once directed towards managing computer systems, applications and data in an IT infrastructure that operated in a (mostly) closed environment. Today, however, IT administration has now evolved to include new applications and computers that often interact with external networks that are not within an IT administrator's control. Examples of an enterprise's interaction with external networks include running email applications and servers, running program and computers that access the Internet, and operating computers that are configured as web servers.

Because IT administration is no longer mostly confined to a local network, there are numerous external threats that IT administrators have to deal with. For example, there are computer viruses, trojans, rootkits, spyware, spam and other malicious software that incessantly threaten IT infrastructures. As a result, IT administrators are responsible for having their IT infrastructure securely configured to thwart such ever-evolving threats, and use various technologies to do so. However, the complexity and variety of the technologies available to secure an IT infrastructure make doing so a challenging task for IT administrators.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which security status information is obtained from network-wide and/or network client security components, and output in a consolidated view for simultaneous evaluation and interaction. Non-limiting examples of such security components include email antimalware state data, email anti-spam state data, network firewall state data, client email security state data, client firewall state data, client program update state data, and state data from a remote security service.

In one example implementation, network security page logic couples to network-wide security components and client security components to obtain security state data for each. A user interface associated with the network security page logic lists at least some of the security components, outputs a current security status for each listed security component, and displays current security state details for a selected security component. Examples of security components that may be listed include a network firewall component, an email anti-malware component, a client anti-malware component, a server anti-malware component, a threat assessment component including for client and/or server security policy compliance, and an automatic updates compliance component. The output of the current security status for each listed security component may, for example, be in the form of an icon that changes its appearance based on the current security status. Other example output on the user interface may, for example, include a mechanism for launching system-wide security tasks and/or context-sensitive security tasks related to the selected security component. A mechanism for resolving a security-related issue (if any) for the selected security component may also be provided.

In general, the user interface consolidates the security state data of an information technology infrastructure into a single page. The page is then updated in response to a change in the security state data.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards a centralized location for managing network security, via a single user interface page or the like. Notwithstanding, it can be readily appreciated that the single page described herein may be alternatively constructed from a set of one or more pages or other display components; thus as used herein, a "single page" refers to what appears to an administrator to be a single page, rather than how the user interface output is actually constructed.

Further, while examples of valuable security-related management information and interactive mechanisms are provided herein, it is understood that these are only examples, and that numerous variations for displaying information and providing interactive mechanisms are feasible. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and network security management in general.

Figure 1:
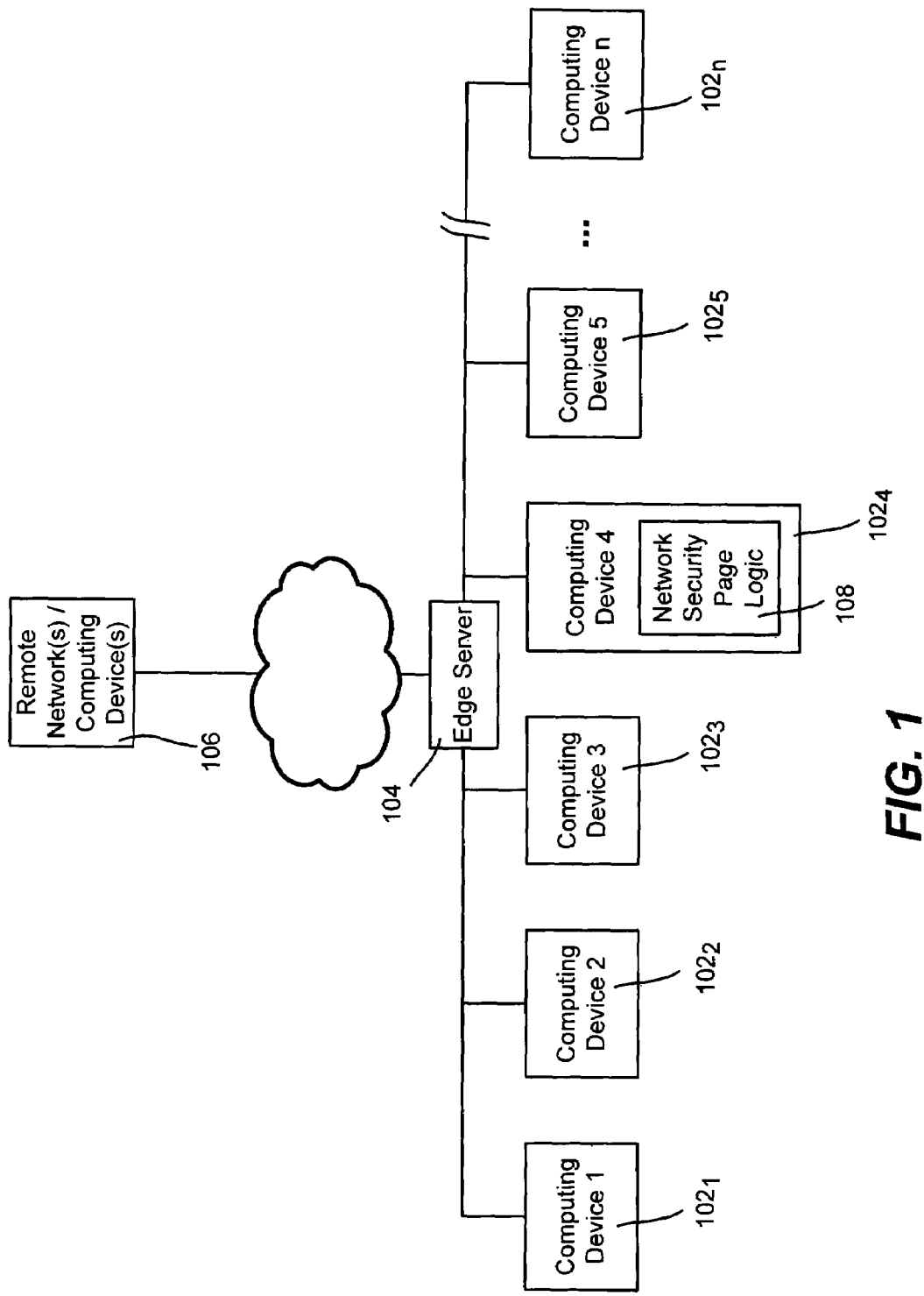
FIG. 1 shows an illustrative example of a general-purpose computing environment into which various aspects of the present invention may be incorporated.

FIG. 1 is a block diagram representing an example network such as an IT infrastructure configured with a number of computing devices $102_1$-$102_n$. In this example configuration, the computing devices $102_1$-$102_n$ connect via an edge server 104 to one or more remote networks (e.g., the internet or other intranets) and/or remote computing devices 106. Although not shown in FIG. 1, it is understood that various other networking components may be present, e.g., routers, switches, hubs, modems, and hardware-based firewalls.

As described below, one of the computing devices (e.g., the device $102_4$) may include network security page logic 108, such as implemented in one or more computer programs. Among other operations, the network security page logic 108 collects security-related information from various security-related technologies, displays the information in a consolidated manner to an administrator, and also allows the administrator to interact with the technologies to resolve security-related issues.

Figure 2:
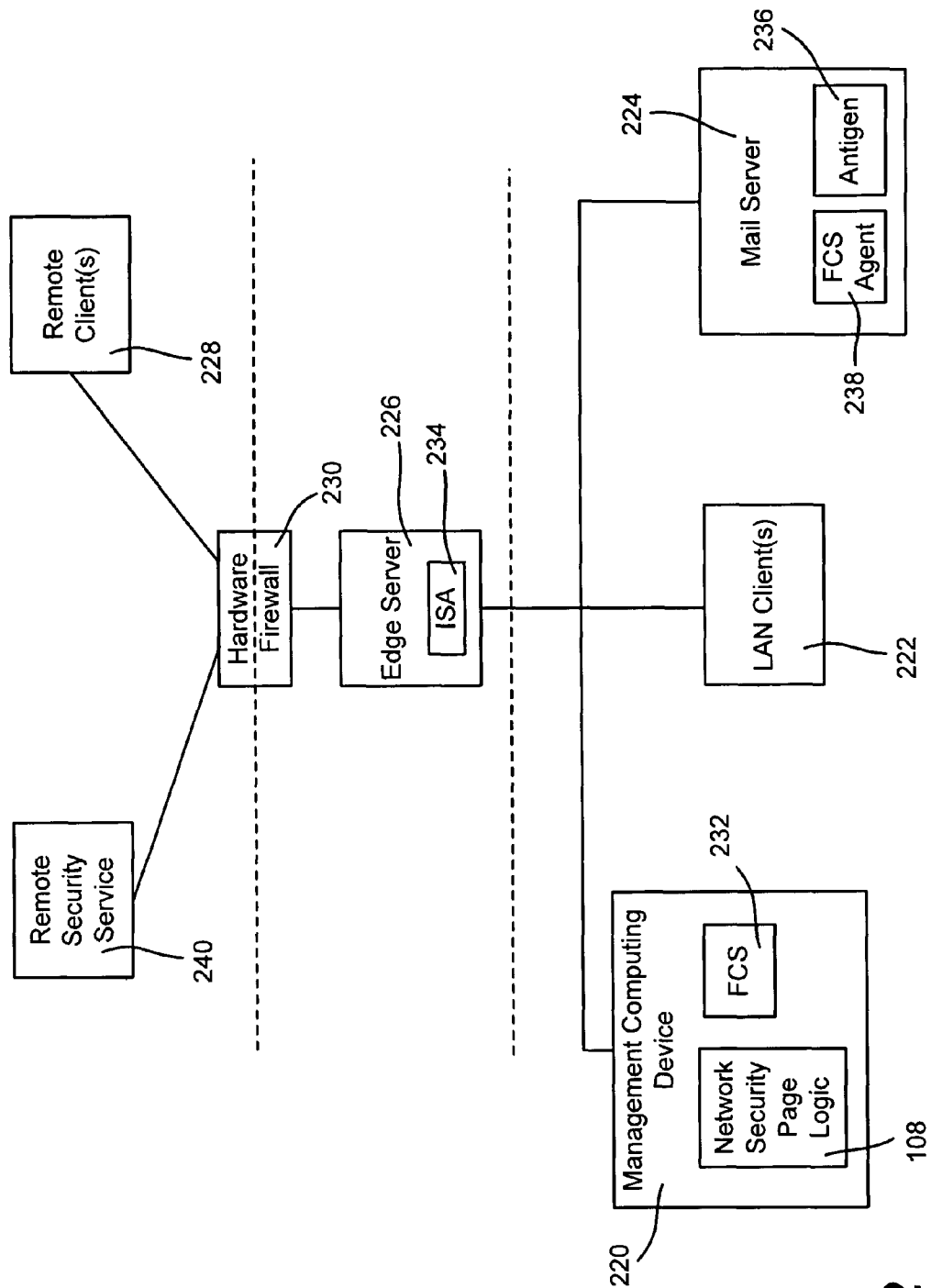
FIG. 2 is a block diagram representation of a more particular example network configuration (e.g., an IT infrastructure) including network security page logic for obtaining network security-related information and consolidating the information into a single page view.

FIG. 2 is a block diagram representing a more particular example IT network infrastructure having a management computing device 220, one or more LAN clients 222, a mail server 224 and an edge server 226. The management computing device 220 includes the network security page logic 108, and thus corresponds to the computing device $102_4$ of FIG. 1. As can be readily appreciated, the functionality performed by the infrastructure may be implemented in a greater number or lesser number of computing devices than those shown in FIG. 2, e.g., there may be multiple mail servers, the management computing device may be part of another computing device, such as by running management programs on a device that also acts as a mail server or web server, and so forth.

In the example of FIG. 2, one or more remote clients 228 are shown connecting to the edge server 226 via a hardware firewall 230. Note that the clients and servers of the network of FIG. 2 are not limited to conventional computer systems, but rather one or more of the clients and/or servers may be other types of devices, such as network appliances. Also represented in FIG. 2 are various security-related components, such as to provide protections like firewall, anti-spam, antimalware on the clients, antimalware for email, antimalware for web traffic, anti-spyware, domain wide security policies and intrusion detection and prevention. Some of these are exemplified as in FIG. 2 as FCS 232 (Forefront Client Security, e.g., including anti-spyware and virus protection tools), ISA 234 (Internet Security and Acceleration server, including a firewall), and Antigen® 236 (email and collaboration server security products, e.g., providing anti-malware and anti-spam security). Other client-related state data, such as wireless local area network access point state data, password protection, web access rights, web security settings, web privacy settings and so forth may likewise be queried and evaluated for compliance or other security issues.

Note that the mail server includes an FCS agent 238, and although not shown, the edge server may include Antigen® for ISA and/or an FCS agent, and the clients 222 and/or 228 may each include an ISA and/or other firewall component, and/or an FCS agent. Further, one or more security services 240 may be remotely located, e.g., email be routed through such a remote service for anti-spam/antimalware scanning instead of (or in addition to) local email scanning. Further, information from remote sources may be displayed on the page, e.g., there may be a link to or data from an RSS feed or other source to provide the administrator with easy access to the latest information on current malware threats.

Figure 3:
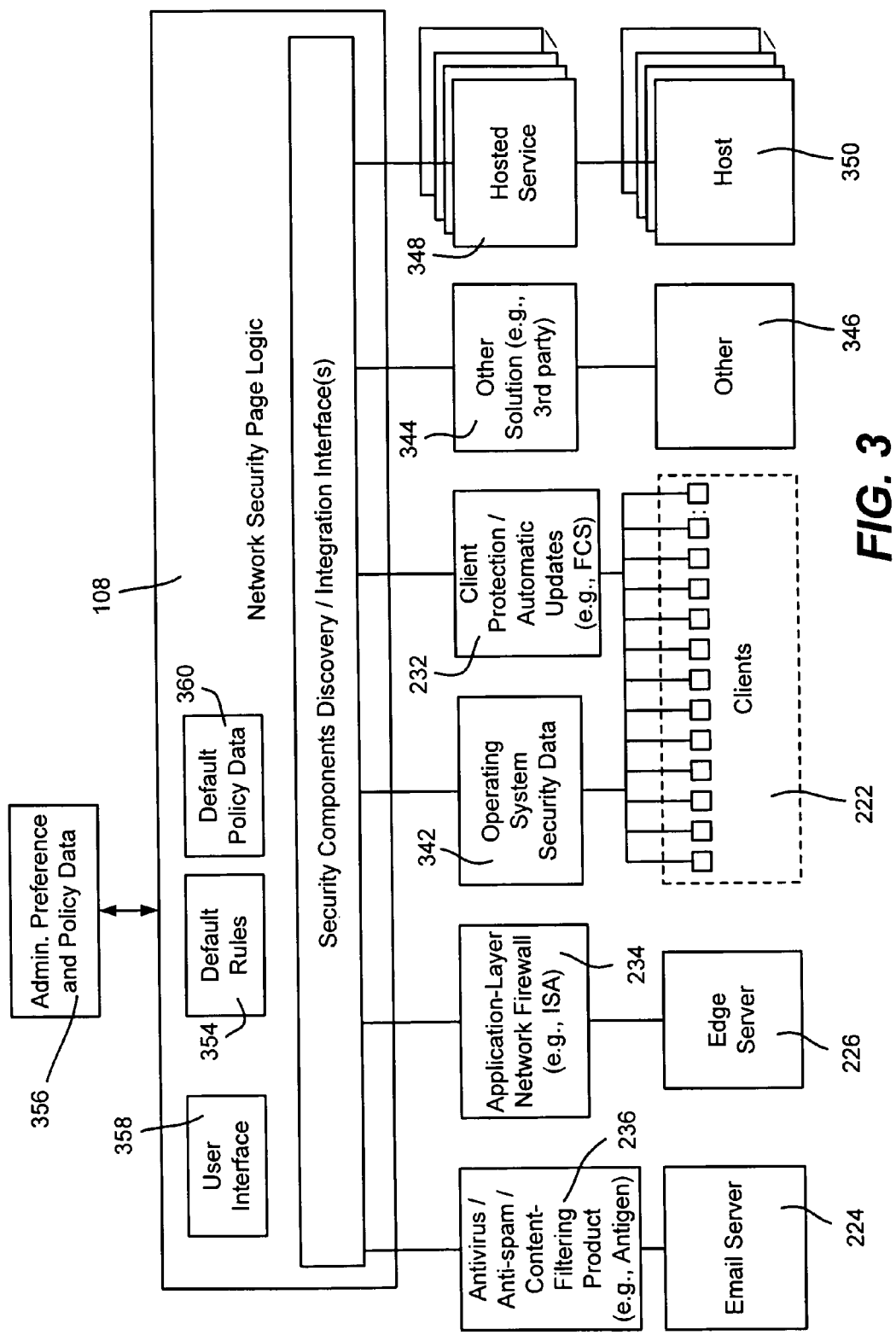
FIG. 3 is a block diagram representing example network security page logic and components coupled to example network security-related components.

FIG. 3 shows how the security page logic provides a consolidated view of security as part of an overall management solution. As described herein, the consolidated view provides an IT administrator with the entire security status of an IT infrastructure via a straightforward graphical representation of the configuration state, (e.g. with red icons with an X-like symbol for a high risk alert, yellow icons with an exclamation point for warnings and green icons with a checkmark for "OK" status. To this end, the logic "rolls up" various security technologies, including those security mechanisms/components represented in FIG. 2 via blocks 232, 234 and 236. Note that FCS 232 may aggregate the security settings of multiple clients 222, e.g., via an FCS agent on each client. Similarly, a security component 342 may be used to aggregate the security settings (e.g., built into the operating systems) of individual clients 222. Still further, any third party security components 344 may be queried for status information, which (as represented via the "other" block 346) may be aggregated from individual clients or as a whole for the network, depending on the type of security technology. Security components in the form of remote and/or hosted services 348, such as for various data protection solutions running on a per-host basis 350 (e.g., for automated backup), may be similarly queried.

To obtain the security status information in the example implementation of FIG. 3, API calls may be made. Essentially any agreed-upon calls and parameters may be passed back and forth. Such calls for security-related information may be made on an occasional, polling-type basis; alternatively the calls can also be used to register for events from the various security components. As can be readily appreciated, other mechanisms and protocols for exchanging data may be used.

As the information is obtained, the network security page logic 108 consolidates the information, and based on default rules 354, which may be overridden by administrator preference data 356, determines how to display the status on the user interface 358. For example, for a given security component, a certain status value may result in an alert (e.g., red with "X") icon being displayed in conjunction with data for that mechanism, while a different status value may result in a warning (e.g., yellow with exclamation point) icon and another status may result in an "OK" (e.g., green with checkmark) icon being displayed. The administrator may set thresholds or the like for such conditions. Also, via the user interface 358, the network security page logic 108 may provide the interactive ability to run tasks, and to restore default policy or otherwise resolve security issues.

Figure 4:
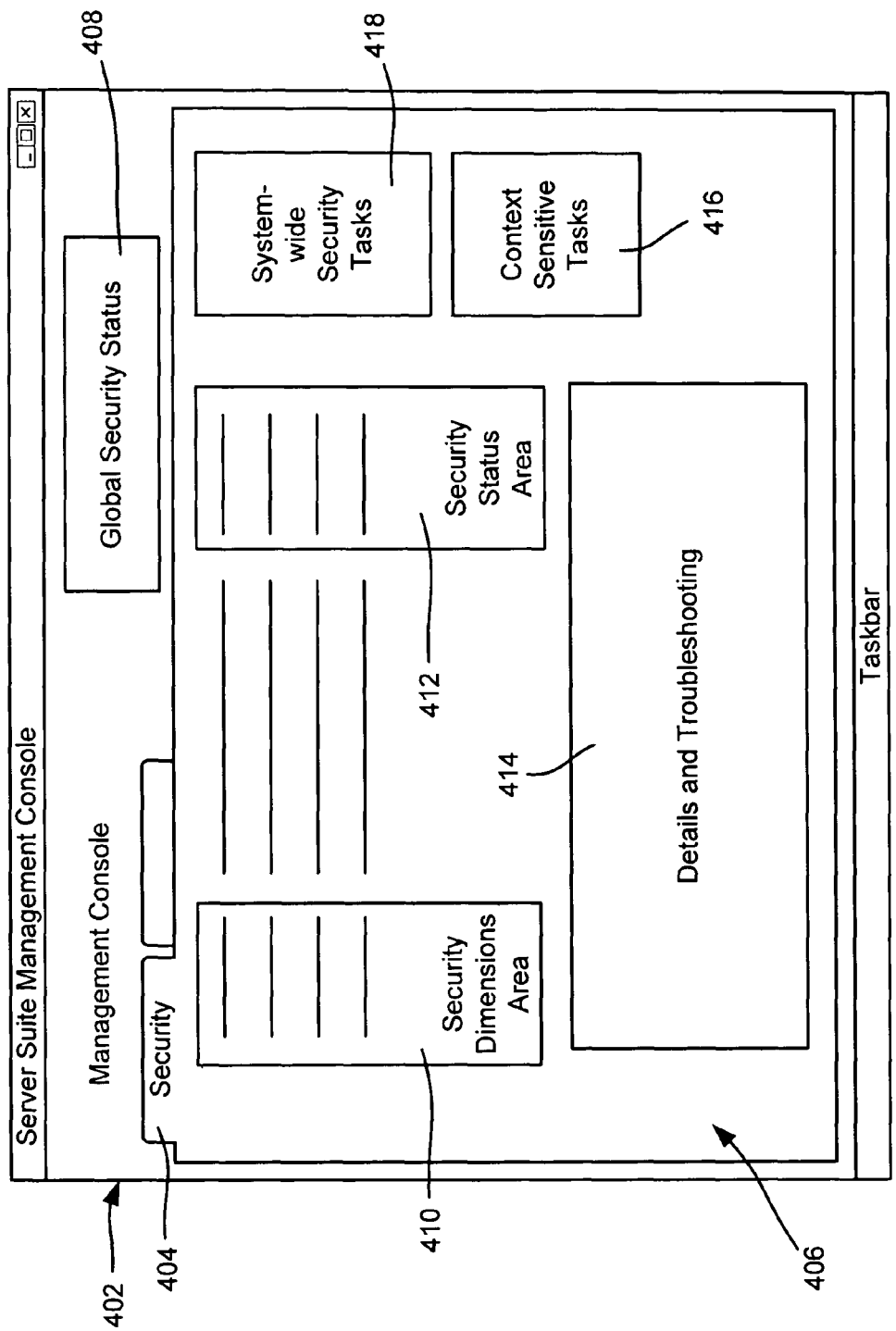
FIG. 4 is a representation of an example page layout for outputting consolidated security-related information in a single page view.

Turning to a consideration of the consolidated view and interactivity page, as generally represented in FIG. 4, there is shown one example of a suitable page layout. In this example, a management console 402 of a suite of network programs or the like may include a security tab 404 that when selected brings up a representation 406 of the network security page user interface 358 (FIG. 3). In this example layout, the management console 402 also provides global security status 408, e.g., important security alerts and security issue information that are shown regardless of whether the security tab 404 is currently selected.

A security dimensions area 410 is provided, essentially for listing the various security mechanisms/components, possibly followed by a description, and a security status for each in its own area 412. FIGS. 5-8 provide more specific examples of such listings. A listed component in the security dimensions area 410 can be selected, whereby details and/or troubleshooting relevant to that component may appear in a details area 414.

Context-sensitive tasks relevant to the selected component may be provided as interactive mechanisms in another area 416. Further, the example layout provides interactive mechanisms for common, system-wide tasks in an area 418. For example, these interactive mechanisms may correspond to dedicated tools, or may provide links to appropriate places in an application to configure security related tasks. This allows an administrator to launch security-related configuration tasks from a convenient place in the management console 402.

Various example aspects of the network security page concepts are represented in the example screen representations of FIGS. 5-8. In general, in FIGS. 5-8, security status information is displayed in each figure with respect to a network firewall, (the perimeter firewall installed for an IT environment), email anti-malware (anti-spam and antimalware protection for email server and gateways), client anti-malware (anti-malware client agents running on all clients and servers on the network), threat assessment (security State assessment of the clients on the network) and automatic updates (compliance with software patches and critical updates for the clients on the network).

Figure 5:
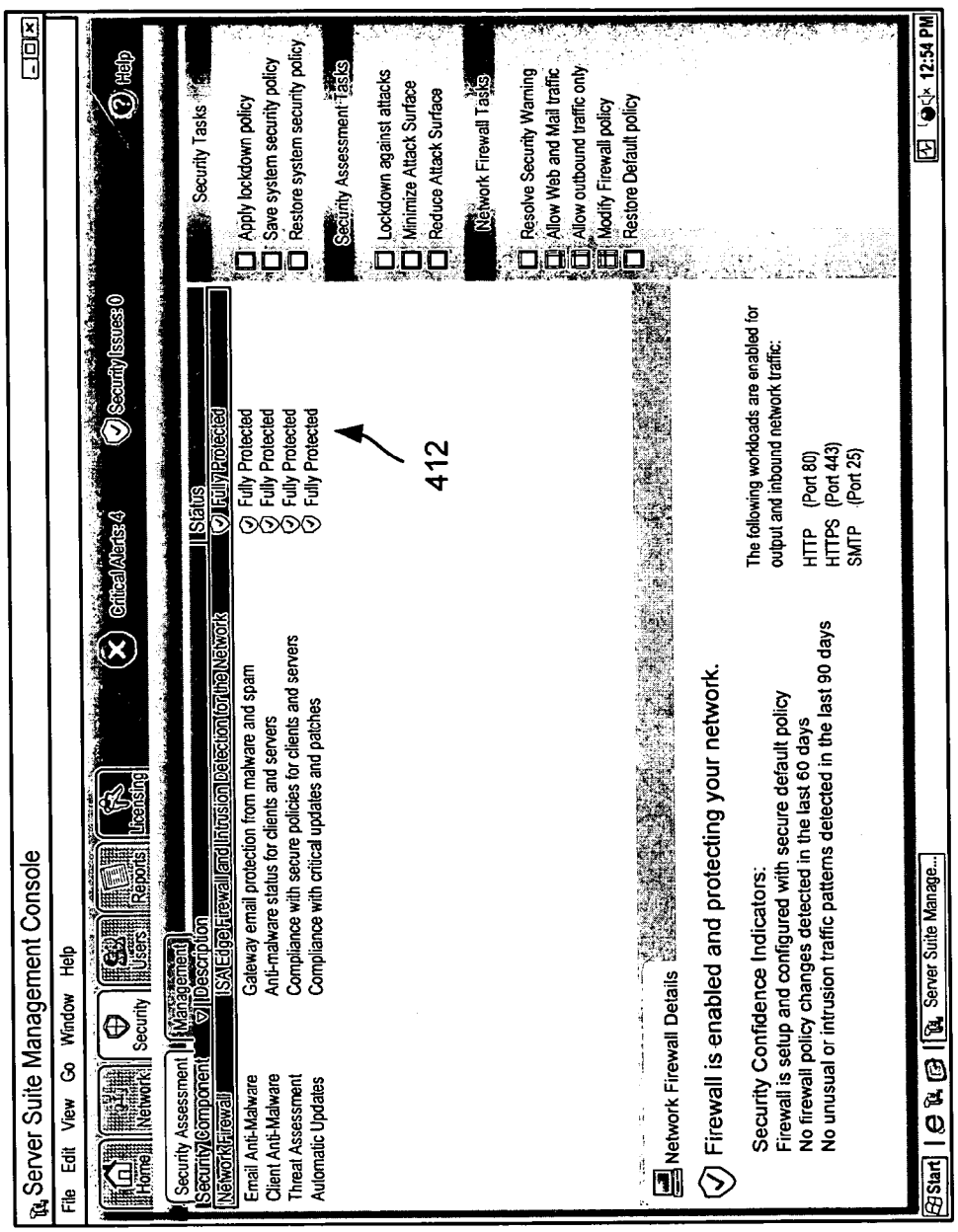
FIGS. 5-8 are representations of example state data output for selected security-related components, with the output configured according to the page layout of FIG. 4.

As can be seen, FIG. 5 is an example representation of a state in which the network firewall component has been selected, e.g., by default or via user interface interaction. With this selection, and in the currently represented state, all listed components are indicated as being secure in their corresponding location in the status area 412, e.g., with a status of "Fully Protected" and appropriate icon (a checkmark icon, typically having a green background in a color image) indicated for each.

Figure 6:
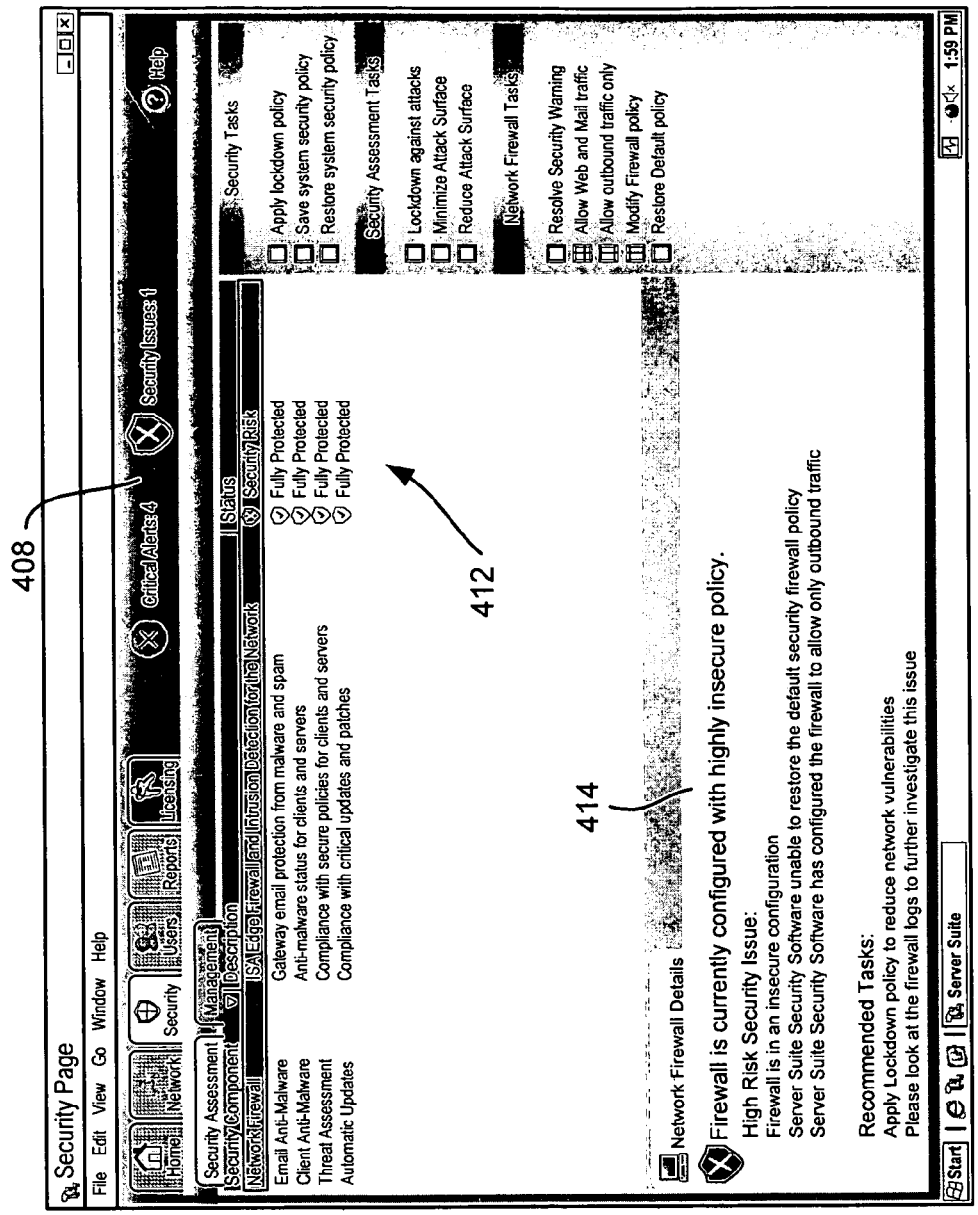

FIG. 6 shows a different state, in which the network firewall component has a security risk identified for it in the status area, as indicated via the "Security Risk" text and accompanying icon (typically having a red background in a color image) with an "X"-like foreground. The details area 414 has been appropriately updated. Note that the global security status area 408 has also changed to show a security risk icon and an appropriately updated counter.

Figure 7:
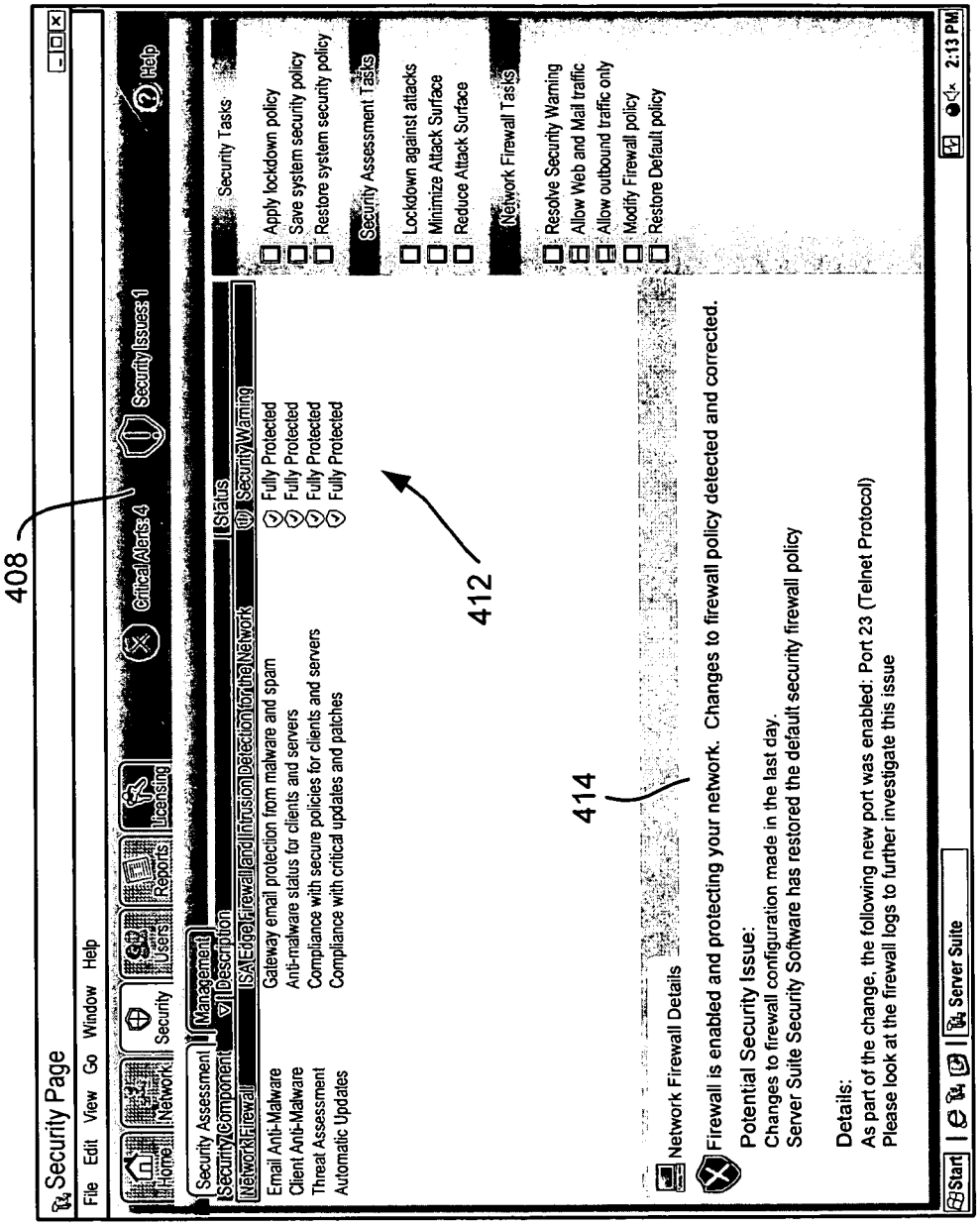

FIG. 7 shows yet another different state, in which the network firewall component has an accompanying warning in the status area 412, as indicated via the "Security Warning" text and accompanying icon (typically having a yellow background in a color image) with an exclamation point. The details area 414 has been updated with appropriate information relevant to this state, as has the global security status area 408.

Figure 8:
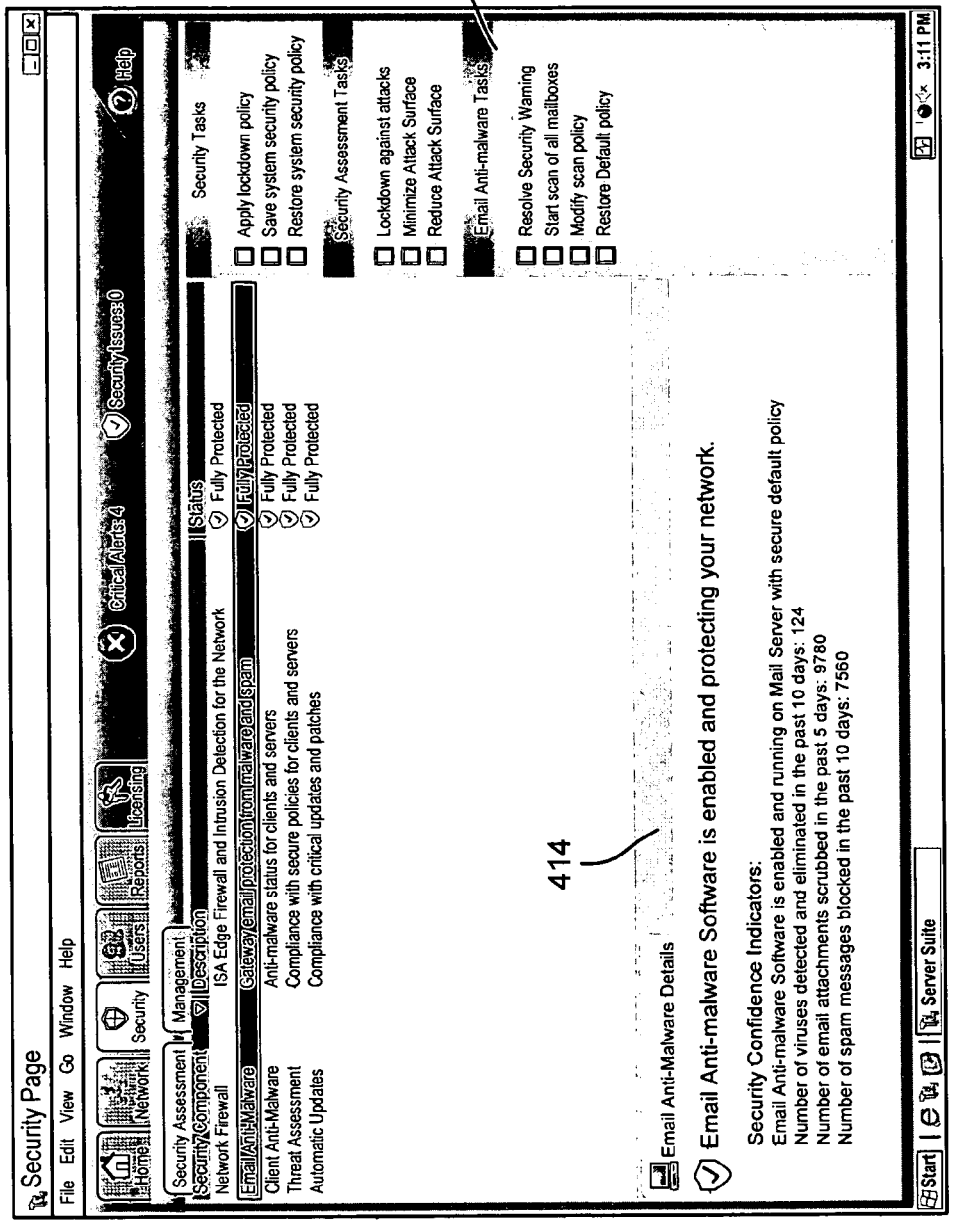

FIG. 8 shows a representation of the user interface 406 when an email anti-malware security component has been alternatively selected by the administrator. As can be seen in FIG. 8, the details and troubleshooting area 414 shows appropriate information relevant to this selection and state. Similarly, the context sensitive tasks 416 are changed to provide interactive mechanisms for email anti-malware-related tasks.

Thus, as can be seen, the network security page provides the logic, infrastructure and user interface for various security components (e.g. host firewall, edge firewall, anti-malware, policies) to be identified and consolidated into a single user interface. Note that although not specifically shown, it is understood that the security components may be categorized, e.g., when multiple mechanisms provide the mitigation for the same threat, such as a host and edge firewall, the listings of those components may be grouped into a hierarchy that displays the components of that specific installation. Note that the security agents for these components are generally distributed across the IT infrastructure as opposed to being installed on a single device.

As shown in the examples of FIGS. 4-8, the user interface representation 406 may include a summary view of security components with a high level graphical view of state via status icons, and an advanced view that allows the administrator to access additional information and common tasks associated with each security agent (e.g. configuring the edge firewall for different applications, changing the settings on the anti-spam filter, and so forth). When the overall state, is not okay, the summary view includes a "one-click" or similar means to get the IT infrastructure back to a secure configuration, or the best practice configuration (e.g., via a snap-in), for a given installation. The management view may also include a straightforward means for an IT administrator to configure, generate and view reports related to security, and to configure alerts specific to security related issues. Historical logs may be kept. Further, the network security page may provide a means to extend the security agents displayed, such as via manual configuration or programmatic interfaces that allow new components to be detected and listed.

Figure 9:
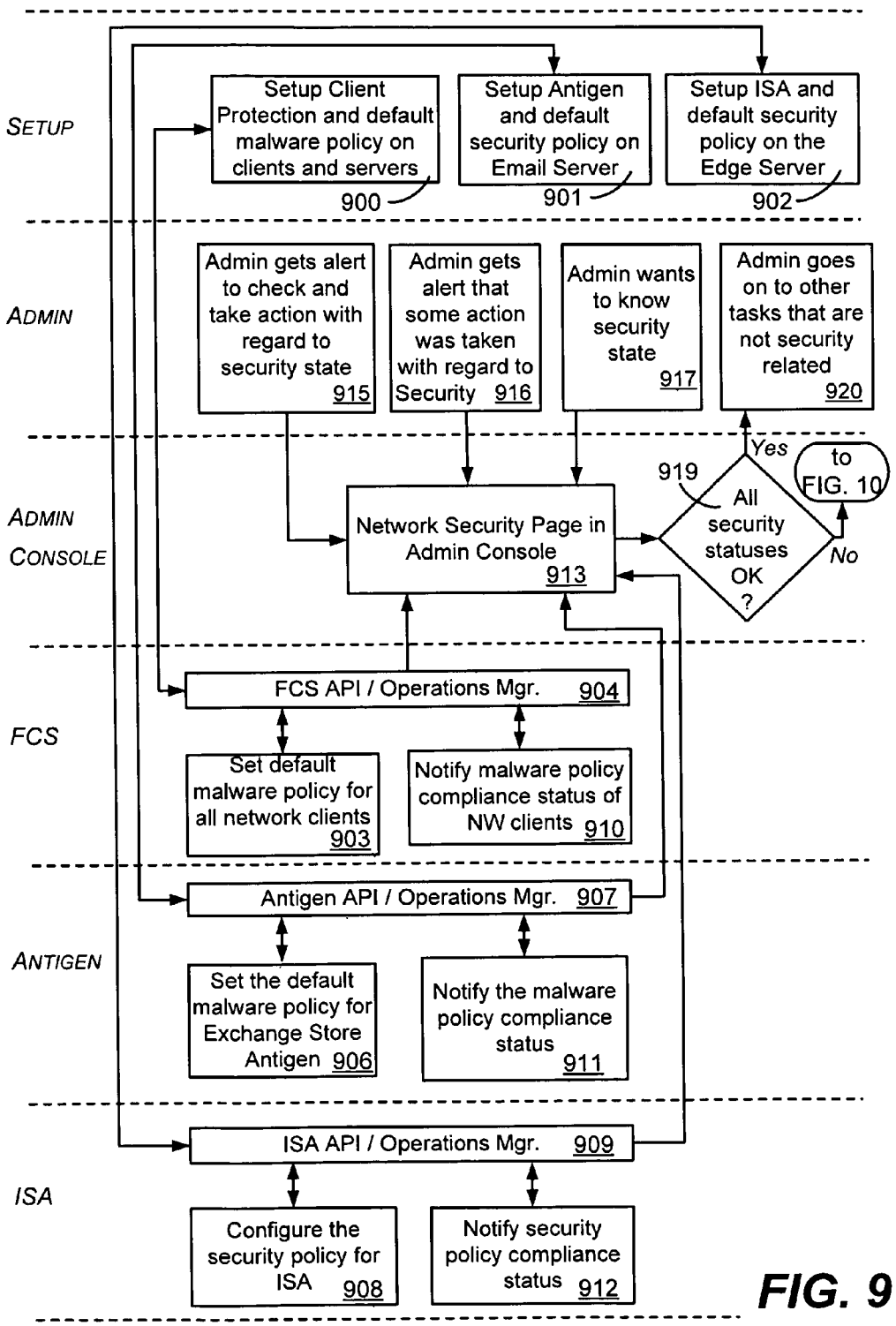
FIGS. 9 and 10 comprise a flow diagram showing an example of setup, monitoring and troubleshooting of anti-malware security components.
Figure 10:
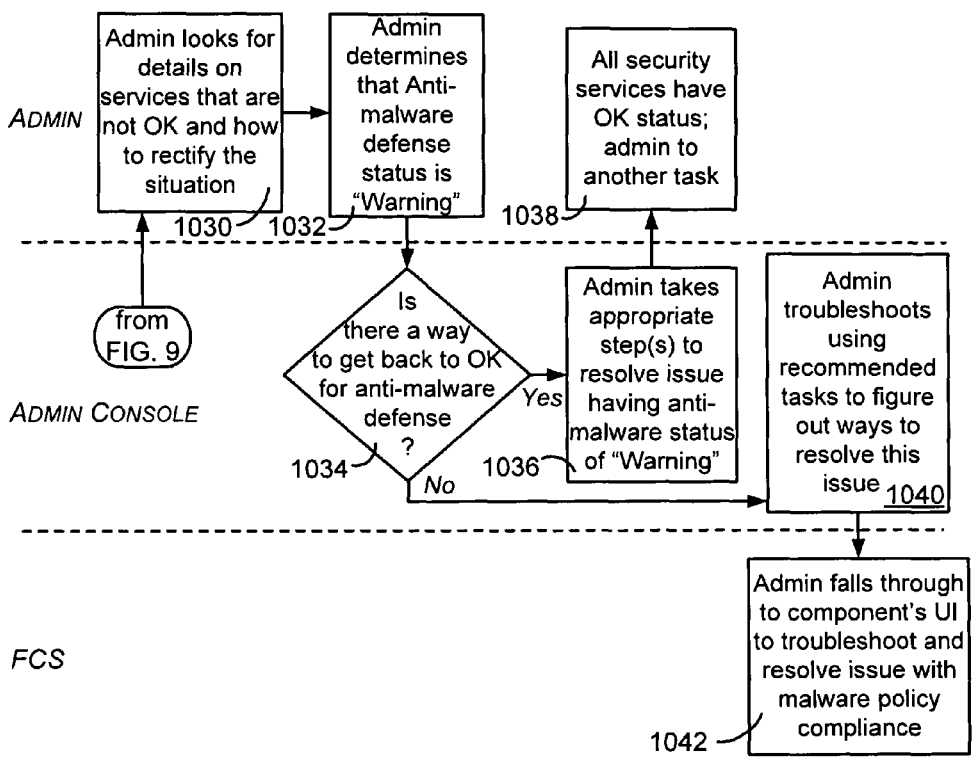

A flow diagram showing the setup, monitoring and troubleshooting of an example anti-malware security component is represented in FIGS. 9 and 10. Setup is performed via blocks 900-902 for FCS on clients and servers (block 900), Antigen® on the email server (block 901), and ISA on the edge server (block 902), which have been described above. In general, the administrator may set the policy for FCS (block 903) via its operations manager component/API 904, for antigen (block 906) via its operations manager component/API 907, and for ISA (block 908) via its operations manager component/API 909. The API operations managers also handle policy compliance status, e.g., as represented in FIG. 9 via blocks 910-912. This information may be reflected in the network security page (block 913) of the administration console, as described above.

The administrator may view and interact with the network security page (block 913), such as in response to alerts (blocks 915 and 916) or because a security status check is desired (block 917). Step 919 represents the evaluation of the security statuses, which may be by the administrator's viewing following blocks 915-917, but also may be done by an automated process or the like, e.g., one that pages or sends an email to an administrator if the infrastructure is in a certain state. If a problem exists, the administrator will generally operate in conjunction with the blocks of FIG. 10, otherwise the administrator will go on to perform other tasks. Such other tasks are represented by block 920, which, for example, are typically not security related tasks, since security is presently satisfactory.

FIG. 10 shows example ways in which an administrator may resolve a security issue, such as by looking on the details area of the network security page (block 1030) for a solution. For example, for a warning status (block 1032), the administrator may look for a straightforward way to eliminate the issue (block 1034 and 1036), such as to restore a default security policy, and then may go on to other tasks (block 1038). Otherwise, the administrator may have to perform some troubleshooting, using recommended ways (block 1040), and/or using the security component's user interface or the like to resolve the issue (block 1042). The change from the network security page to an appropriate location/display within the security component's user interface may be automatic.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. Computer-readable storage device having computer-executable instructions that, when executed by a computing device, cause the computing device to perform a method comprising:
   obtaining security status information from a plurality of security components of an IT infrastructure, wherein the plurality of security components includes security components of a network and security components of a plurality of clients on the network, wherein one of the security components is configured for aggregating security settings of the plurality of clients, and wherein the security settings of the plurality of clients include operating system security settings;
consolidating the security status information into a single page of a visible representation configured to provide simultaneous evaluation of and interaction with the security status of the plurality of security components;
determining, by network security page logic configured for operating on the computer and based on default rules that are overrideable by administrator preference data, how to display on the single page the consolidated security status information that comprises a global security status of the IT infrastructure, a list of the plurality of security components, a security status from each of the listed plurality of security components, and security status details of a selected one of the listed plurality of security components, context-sensitive task links, and system-wide task links;
displaying, in the single page based on the determining, the global security status of the IT infrastructure;
displaying, in the single page based on the determining, the list of the plurality of security components;
displaying, in the single page based on the determining, the security status from each of the listed plurality of security components;
displaying, in the single page based on the determining, the security status details of a selected one of the listed plurality of security components, wherein the security status details are related to the security status corresponding to the selected one of the listed plurality of security components;
displaying, in the single page based on the determining, the context-sensitive task links, wherein each of the context-sensitive task links is configured to launch a security-related task that applies to the selected one of the listed plurality of security components; and
displaying, in the single page based on the determining, the system-wide task links, wherein each of the system-wide task links is configured to launch a security-related task that applies to the IT infrastructure as a whole.

2. The computer-readable storage device of claim 1 wherein obtaining the security status information from a plurality of security components includes obtaining email anti-malware or email anti-spam state data, or both.

3. The computer-readable storage device of claim 1 wherein obtaining the security status information from a plurality of security components includes obtaining wireless local area network access point state data.

4. The computer-readable storage device of claim 1 wherein obtaining the security status information from a plurality of security components includes obtaining network firewall state data.

5. The computer-readable storage device of claim 1 wherein obtaining the security status information from a plurality of security components includes obtaining security status corresponding to client computing devices of the network.

6. The computer-readable storage device of claim 5 wherein obtaining the security status corresponding to client computing devices of the network includes obtaining client email security state data, obtaining client firewall security data, or obtaining network quarantine state data, or obtaining any combination of client email security state data, client firewall security data, or network quarantine state data.

7. The computer-readable storage device of claim 5 wherein obtaining the security status corresponding to client computing devices of the network includes obtaining client program update state data, obtaining security signature update state or obtaining general security configuration and alerts on the client, or obtaining any combination thereof.

8. The computer-readable storage device of claim 1, the method further comprising, generating alerts based on one or more system-wide security states, or taking action based on changes in one or more system-wide security states, or both.

9. The computer-readable storage device of claim 1 wherein obtaining the security status information from a plurality of security components includes obtaining state data from a remote security service.

10. In a network, a system comprising:
network security page logic configured for consolidating status information from security components that include security components of the network and from security components of a plurality of clients on the network, and further configured for determining how to display the consolidated status information on a user interface, wherein the determining is based on default rules that are overrideable by administrator preference data, wherein one of the security components is configured for aggregating security settings of the plurality of clients, and wherein the security settings of the plurality of clients include operating system security settings;
a computer device configured to couple the network security page logic to security components comprising network-wide security components and client security components, wherein the network security page logic is configured to obtain security state data from each security component, and wherein the network comprises the security components; and
a single page of the user interface configured to:
display a global security status of the network;
display a list of the security components;
display a security status for each of the listed security components based on the corresponding security state data;
display security status details of a selected one of the listed security components, wherein the security status details are related to the security status corresponding to the selected one of the listed security components;
display context-sensitive task links, wherein each of the context-sensitive task links is configured to launch a security-related task that applies to the selected one of the listed security components; and
display system-wide task links, wherein each of the system-wide task links is configured to launch a security-related task that applies to the network as a whole.

11. The system of claim 10 wherein a user selection of one of the system-wide task links launches a corresponding task.

12. The system of claim 10 wherein a user selection of one of the context-sensitive task links launches a corresponding task.

13. The system of claim 10 wherein the security components that are listed include at least one component of a set, the set containing, a network firewall component, a wireless local area network access point, an email anti-malware component, a client anti-malware component, a server anti-malware component, a threat assessment component including for client or server security policy compliance or both client or server security policy compliance, and an automatic updates compliance component.

14. The system of claim 10 wherein the displayed security status for each listed security component comprises at least one icon that changes its appearance based on a change in the corresponding security status.

15. The system of claim 10 wherein the user interface is further configured to display a representation of a mechanism for resolving a security-related issue, such that interaction with the representation resolves the security-related issue.

16. In an information technology infrastructure, a method comprising:

providing a user interface that consolidates security state data of the information technology infrastructure into a single page, wherein the information technology infrastructure comprises security components that include security components of a network and security components of a plurality of clients on the network, wherein one of the security components is configured for aggregating security settings of the plurality of clients, and wherein the security settings of the plurality of clients include operating system security settings;

updating the user interface in response to a change in the security state data;

determining, in response to the updating, how to display the consolidated security state data on the single page, wherein the determining is based on default rules that are overrideable by administrator preference data;

displaying, in the single page in response to the determining and based on the security state data, a global security status of the information technology infrastructure, a list of security components of the information technology infrastructure, a security status from each of the listed security components, security status details of a selected one of the listed security components, wherein the security status details are related to the security status corresponding to the selected one of the listed plurality of security components, context-sensitive task links, wherein each of the context-sensitive task links is configured to launch a security-related task that applies to the selected one of the listed security components, and system-wide task links, wherein each of the system-wide task links is configured to launch a security-related task that applies to the information technology infrastructure as a whole; and wherein the method is performed by a computing device.

17. The method of claim 16, the method further comprising displaying in the single page troubleshooting information for the selected one of the listed security components.

\* \* \* \* \*